Figure 1:
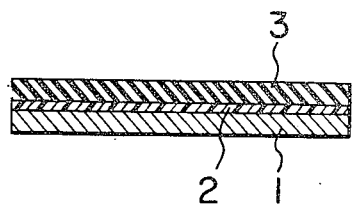

United States Patent
Koori et al.

[15] 3,686,731
[45] Aug. 29, 1972

[54] SILICONE RUBBER BONDED TO SYNTHETIC RUBBER UTILIZING ORGANOTRIHALOGENOSILANE AS A PRIMER

[72] Inventors: Shigeyoshi Koori, 359, Kami, Ageo-shi, Saitama-ken; Hiroshi Inomata, 12-37, Isobe 3-chome; Kiyoshi Imai, 6-10, Isobe 3-chome, both of Annaka-shi, Gunma-ken, all of Japan

[22] Filed: Oct. 6, 1970

[21] Appl. No.: 78,416

[30] Foreign Application Priority Data

Oct. 7, 1969  Japan ..................... 44/80047

[52] U.S. Cl. .................... 29/132, 117/72, 161/208, 156/329
[51] Int. Cl. ...................... B32b 25/08, B32b 25/20
[58] Field of Search ...... 117/72, 126 GS, 75, 161 ZA; 260/448.2 Q; 161/208, 206; 156/329, 307, 308, 309, 314, 315; 29/132

[56] References Cited

UNITED STATES PATENTS 3,373,049  3/1968  Nitzsche ..................... 117/76
3,307,967  3/1967  Vanderbilt ................... 117/77
2,767,519  10/1956  Bjorksten .................. 117/72 X Primary Examiner—Robert F. Burnett
Assistant Examiner—Lorraine T. Kendell
Attorney—McGlew and Toren

[57] ABSTRACT

A layer composition which is prepared by bonding room temperature-curing type silicone rubber and a synthetic rubber layer with a primer consisting essentially of organotrihalogenosilane represented by the general formula:

$$RSiX_3$$

(where R is selected from the group consisting of a vinyl radical and an allyl radical, and X is a halogen atom).

The layer composition is useful as a material for preparing various industrial instruments, which has excellent bonding strength and durability, particularly, as a silicone rubber coated roll, which would stand a long operation at high temperatures and under strong nip pressure.

7 Claims, 2 Drawing Figures

3,686,731

INVENTORS
SHIGEYOSHI KOORI
HIROSHI INOMATA
KIYOSHI IMAI

BY *McGlew and Toren*

ATTORNEY

SILICONE RUBBER BONDED TO SYNTHETIC RUBBER UTILIZING ORGANOTRIHALOGENOSILANE AS A PRIMER

SUMMARY OF THE INVENTION

This invention relatesto a layer composition having improved bonding strength and durability.

It is widely practiced in industries to apply silicone rubber to rigid materials such as metals, porcelain and glass, or to elastic or flexible materials such as rubbers, plastics and textiles, in order to prepare laminates or coated materials. In such an application, the use of a primer which will improve or make more effective the adhesion of silicone rubber to other material is considered indispensable, and a large number of materials are proposed or put to the market to serve the purpose.

However, most of the primers hitherto proposed have fallen short of the requirements. For example, in the case of a nip roll which is made of an iron roll or a rubber-coated iron roll, and further covered with silicone rubber bonded to it, and which revolves and presses a belt sheet at a high temperature, or in the case of a loop belt made of a rubber-coated textile, which is further covered with silicone rubber bonded to it, the bonded surfaces are repeatedly subjected to complex loads of compression, tension and shearing, so that the strength of adhesion of the silicone rubber to which the known primers are applied would not meet the purpose at all as will be described later.

As is already known, silicone rubber is an elastic material which exhibits, when put to mechanical use in industry, excellent heat stability, oil resistance, electrical properties, and in particular, non-adhesiveness, so that if the application of this substance, as a stable coating material, to the above-given rolls, belts, and other vessels, is made possible, a great deal of benefit would be brought about by it.

In studying primer compositions which would make it possible for silicone rubber to be bonded, in a stable state, as a coating material, so as to be put to use under rigorous conditions for a long time, we have succeeded in obtaining primer compositions which would satisfy the requirements already mentioned, having from 5 to 10 times as great an adhesive strength as the one possessed by the known primers or especially by the commercially available ones.

Consequently, an object of the present invention is to provide a layer composition which is prepared by bonding silicone rubber and a substratum layer with a primer, which has excellent bonding strength and durability, and another object of the invention is to provide a silicone rubber-coated roll, prepared by covering with silicone rubber, a metal roll or a natural- or synthetic-rubber-coated metal roll, which would stand a long operation at a high temperature and under strong nip pressure. Still another object is to provide a loop-shaped silicone rubber belt prepared by covering, with silicone rubber, a flexible belt chiefly made of natural or synthetic rubber, which would guarantee a stable operation under the load of repeated bending. A further object of the invention is to provide a method for bonding, uniformly and strongly, silicone rubber over the surfaces of substrata of metals, porcelain, glass or natural or synthetic rubbers, particularly over the irregular surfaces thereof.

This invention relates to a layer composition which is prepared by bonding silicone rubber and a substratum layer with a primer substantially consisting of organotrihalogeno-silane represented by the general formula:

$$RSiX_3$$

(where R is selected from the group consisting of vinyl radical and allyl radical, and X is halogen atom).

The purposes of the invention are attained by the use of primers which form a layer having improved adhesion both to silicone rubber and other materials and the primers consist of organotrihalogenosilanes represented by the above formula. Such organotrihalogenosilanes are exemplified by vinyl trichlorosilane, vinyl tribromosilane, allyl trichlorosilane, and allyl tribromosilane. The silicone elastomer employed in practicing the present invention is either (i) a room-temperature curing (abbreviated hereafter as RTV) silicone elastomer which, before or just at the point of use, is mixed with a proper amount of some catalyst such as organic tin, etc., and injected or flowed over the surface of the substratum so as to be cured at room temperature, or (ii) a heat-curing silicone elastomer, to which is added a curing agent of benzoyl peroxide, etc., and which then is molded and cured by heating. Any silicone elastomer generally used may be employed in it.

The substratum to which the primers given above can be effectively applied are steel, cast steel, iron alloys, aluminum, aluminum alloys, and nickel alloys (e.g., stainless steel), and porcelain and glass; and particularly when the silicone elastomer is RTV, such substratum as molding materials of natural or synthetic rubbers or thermo-setting resins such as epoxy resins and phenol resins, and thermoplastic resins such as polycarbonate and polyamide are included besides the above-given ones.

Figure 2:
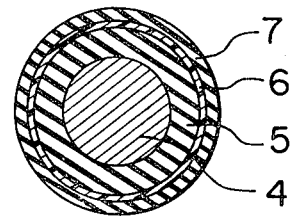

The following is a description, given with reference to figures, of layer compositions of the invention. Of the two figures;

FIG. 1, shows a longitudinal section of a plate-shaped layer which is one embodiment of the invention, and;

FIG. 2, a horizontal section of a roll-shaped layer which is another embodiment of the invention.

In FIG. 1, 1 denotes a substratum of an iron plate degreased with trichloroethylene, 2, a layer of a primer of an organosilane, and 3, a coating layer made of heat-curing type silicone rubber; and in FIG. 2, 4 denotes a metal axis, 5, a layer of elastic substratum made of natural or synthetic rubber, 6, a primer layer of an organosilane and 7, a coating layer of room-temperature-curing-type silicone rubber.

Before practicing the method of the invention, the surfaces of the substratum to which the primer are to be applied must be made clean by removing the impurities of oxide films or of oils and fats, or by scouring or sand-blasting the surfaces. Sometimes it may be necessary to remove the surfaces or make them rugged. Any known method for cleaning may be employed either alone or in combination of two or more, depending upon the properties and shapes of the substances, such as washing in inorganic acid solutions or in degreased solvents (e.g., trichloroethylene), blasting with steel grains or sand, or polishing with sand paper.

In applying the primer substantially consisting of organotrihalogenosilane to the surfaces of the substratum cleaned as above, the organotrihalogenosilanes may be used either as they are or as diluted in some organic solvents such as benzene, toluene, xylene, cyclohexane or n-hexane. Cares should be taken so that the required amount of the primer may be uniformly applied over the surface with a brush or other proper means.

If the amount of the primer applied to the surface is too small, no effective strength of adhesion will be obtained, so that a proper amount of the primer is at least 10 g/m$^2$.

Over the surface of the substratum thus treated with the primer as described above, the silicone elastomer is applied or flowed in the desired thickness or shape and subsequently let to stand at room temperature or subjected to heating so as to be cured, thereby bonding the surface of the substratum and that of the cured silicone rubber.

The amount of silicone elastomer to be applied varies, depending upon the kind of silicone elastomer, viz., whether it is RTV or heat-curing silicone elastomer, and the application method is to be selected in accordance with the shape of the substratum.

As to RTV elastomer, a higher hardness of the cured product can be obtained in the case of two-package type silicone rubber, to which is added some catalyst in point of use, than in the case of one-package type silicone rubber to which has been added a catalyst beforehand, so that the former is used where a high hardness is required. In any case, either of them may be diluted with diluents such as low-viscosity polysiloxane compound or organic solvent. Prior to application, the uncured liquid RTV must be defoamed, which is carried out by a conventional method under reduced pressure. The defoamed liquid RTV, yet to be cured, is applied either by spreading it with a knife-coater in order to give a smooth surface, or by pouring it in a frame as the case may be. It takes about 1 to 3 hours for the applied RTV elastomer to begin to cure, therefore cares should be taken so that the applied liquid may not undergo any change by flowing, but keep the desired shape during the period.

As to the application of heat-curing silicone elastomer, some hardening agent is added to it, in the first place, and the mixture is kneaded. The rubber, thus prepared and yet to be cured, is applied, under pressure, to the surface of the substratum treated with the primer, and heated, while the temperature is raised stepwise from 120° to 250° C. for a period of from 8 to 12 hours, thereby completing curing.

When the substratum to be coated is an ordinary one, no special method is proposed for making preparations for the application of said silicone rubber or for applying the silicone rubber to the surface of the substance treated with the primer, but such methods as are different from those given above are never to be excluded.

As is clear from the Examples and Controls as given later, the primer consisting of organotrihalogenosilane employed in practicing the present invention exhibit particularly strong adhesion when silicone rubber is bonded to substrata of metals, or more preferably, of rubbers, so that when any of them is employed in bonding silicone rubber to a rubber roll where particularly strong nip pressure is applied, it will be very effective.

If silicone elastomer is to be bonded with a substratum whose surface is not level, as in the case of a roll, the heat-curing type silicone elastomer may be applied, usually by the known method, but in the case of RTV elastomer which is viscous and fluid, it is advisable to employ a frame, between which and the surface of the substratum is injected RTV elastomer: e.g., when a roll is to be coated with RTV elastomer, a tube-shaped frame is fastened cocentrically with the roll, and into the space between the frame and the roll is injected RTV elastomer and after it is cured, the frame is removed.

In some cases, the application of RTV elastomer to a roll, a loop-shaped belt, a conduit pipe or a tubular or angular vessel, which can be put on a single revolving axis, can be conducted while the object to be treated is revolved on the axis, viz., while such an object is revolved on the axis, a silicone elastomeric composition is flowed over the surface until a coating layer of desired thickness is formed, and the curing of RTV is let to proceed during the revolution so that no uneven coating due to the dripping of the fluid RTV may take place. It is very often necessary, in preparing an RTV rubber-coated roll, to control within certain ranges, both the hardness of the surface of silicone rubber layer and the elasticity of said layer of silicone rubber. In such a case, RTV alone may not satisfy the above requirement, and to meet the required elasticity of the coating layer, sometimes an exceedingly thick layer will have to be formed. As the primer have a very superior adhesion both to RTV and to natural and synthetic rubbers, a steel roll, coated with natural or synthetic rubber may be further coated with RTV rubber in such a way that the hardness and the thickness of the double layers may be made to meet the requirement. In this way a roll which can stand a strong nip pressure may be economically prepared. Such an RTV-coated roll is superior, both in mold-releasability and economical operation, to any other elastic roll hitherto known and will serve various industrial purposes.

Now, the present invention is illustrated by the following examples and controles, though it should be obvious that the present invention is in no way limited thereto.

In the Examples and Controls, the strength of adhesion of the bonding material is represented by the peel strength, which is given by the maximum stress required for breaking the bonded surface, and the bond failure, which is given by the area in percentage where the adhesion layer has remained unbroken against the total area where it has been broken, and also by the total number of workdays before the roll coated with 2–10 mm thick silicone rubber, which is operated at the rate of 120–140 rpm at 100°–120° C. under the nip pressure of 15 kg/cm, falls apart at the bonded surface.

In order to measure the peel strength and the bond failure, the following test was conducted. To a sample strip, 2 inches × 0.5 × 0.5 of an inch, was bonded another strip of the same size and material, and the bonded strip was quietly pulled. The maximum tensile strength required for the 2 inches × 0.5 inch surface to be broken or peeled off, and the size of the area of the adhesive layer peeled off, where employed for calculating the peel strength and the bond failure. (Cf. ASA, A 116, 1, 1960) Consequently, the peel strength where the bond failure is 100 percent denotes the tensile strength of the silicone rubber itself.

When very large, the total number of the workdays of the roll is seldom correlative with the peel strength or the bond failure. This is because the total number of workdays corresponds to the comprehensive influence of loads where complicated peeling stress works repeatedly at a high temperature, so that it shows very precisely the actual strength of adhesion in which durability of the adhesive is taken into account.

In the examples given below, the following silicone gum compounds and catalysts were employed.

COMPOUND A

Hydroxy-endblocked dimethylpolysiloxane having 5,000 cs of
viscosity at 25° C. — 100 weight parts
Diatomaceous earth — 35 weight parts

COMPOUND B

Hydroxy-endblocked dimethylpolysiloxane having 2,000 cs of
viscosity at 25° C. — 100 weight parts
Diatomaceous earth — 40 weight parts
Red iron oxide — 60 weight parts
Phenyl triethoxy silane — 10 weight parts

COMPOUND C

Hydroxy-end-blocked dimethylpolysiloxane having 2,000 cs of
viscosity at 25° C. — 100 weight parts
Diatomaceous earth — 45 weight parts
Phenyl triethoxysilane — 8 weight parts

COMPOUND D

Siloxane gum represented by general formula;

$$(CH_3)_3SiO \left[ \begin{pmatrix} CH=CH_2 \\ | \\ SiO \\ | \\ CH_3 \end{pmatrix}_{0.2} \begin{pmatrix} CH_3 \\ | \\ SiO \\ | \\ CH_3 \end{pmatrix}_{99.8} \right]_n Si(CH_3)_3$$  68 weight parts $n =$ about 4,000

Humed silica having 200 m²/g of specific surface area
— 30 weight parts
Diatomaceous earth — 30 weight parts
Diphenylsilane di-ol — 3 weight parts
Powdery zinc oxide — 1 weight parts

Catalyst $a$

Ethyl polysilicate — 88 weight parts
Dibutyl-tin-dilaurate — 12 weight parts

Catalyst $b$

Dibutyl-tin-dilaurate — 100 weight parts
Polyethylen glycol (surfactant) 30 weight parts

Catalyst $c$ 2-4-dichlorobenzoylperoxide — 50 weight parts
Trimethylsilyl-endblocked dimethylpolysiloxane — 50 weight parts

PREPARATION OF SAMPLES

Example 1.

The surface of an 8-mm thick chloroprene rubber bonded to an iron plate was well polished with abrasive paper, and over the polished surface was evenly applied, as a primer, vinyl trichlorosilane, at the rate of 170 g/m², and was dried at room temperature. One pair of such chloroprene rubber strips was prepared and between the two treated surfaces confronting with each other, a two-package-type silicone elastomer, consisting of 8 kg of Compound (A) and 0.2 kg of Catalyst (a), which were mixed together and defoamed, was injected and let to stand for 3 days at room temperature of 20°–25° C. and under relative humidity of 65 percent. A sample strip of the size given above was prepared to be put to the test.

Example 2

An experiment similar to the one described in Example 1 was conducted, in which some differences were that allyl trichlorosilane was applied, as a primer, at the rate of 160 g/m² and that the two-package-type silicone elastomer was of 4.5 kg of Compound (B) and 0.45 kg of Catalyst (b). A sample strip was prepared as in Example 1.

Example 3

An experiment similar to the one described in Example 1 was conducted, in which some differences were that vinyl trichlorosilane was applied, as a primer, at the rate of 5 g/m², 10 g/m², 20 g/m², 40 g/m², 60 g/m² and 100 g/m², respectively, and that the two-package-type silicone elastomer was of 8 kg of Compound (C) and 0.05 Kg of Catalyst (b). 6 different kinds of sample strips were prepared in this way.

Example 4

An experiment similar to the one described in Example 1 was conducted, in which some differences were that the silicone elastomer and the primer were similar to those in Example 3, that the rate of the primer applied was 40 g/m², and the rubbers bonded to iron plates were of styrene-butadiene rubber and of natural rubber, respectively. Two different kinds of sample strips were prepared in this way.

Example 5

An experiment similar to the one described in Example 4 was conducted, in which some differences were that an iron plate was immersed in concentrated hydrochloric acid for washing, in order to remove the oxide film and adhered matters, and then washed in trichloroethylene for degreasing, and dried; that an aluminum plate was prepared which had been polished with abrasive paper and degreased just like the iron plate; that an 18–8 stainless steel plate was prepared which had been treated just like the aluminum plate; and that an epoxy resin plate was prepared which had been well polished with abrasion paper. Four different sample strips were prepared in this way.

Example 6

Iron plates, aluminum plates, and stainless steel plates, whose surfaces had been treated as described in Example 5, were prepared besides well-degreased porcelain plates. 8 kg of Compound (D) was mixed with 0.104 kg of Catalyst (d) and kneaded on a roll to prepare a heat-curing silicone elastomer. Over the bonding side of the cleaned surface of each of the above-mentioned plates was applied vinyl trichlorosilane at the rate of 40 g/m² and was dried. Between each pair of these plates confronting with each other was inserted under pressure, the above-described silicone elastomer, cured for 10 hours while the temperature was raised from 130° to 135° C. stepwise, and subsequently it was let to stand at room temperature for 24 hours. Four kinds of sample strips of the size given in Example 1 were prepared in this way.

Example 7

To iron plates whose surfaces were treated just as in Example 5 was applied, as a primer, allyl trichlorosilane at the rate of 40 g/m², and the rest of the experiment was conducted as described in Example 6, obtaining a sample strip.

Control 5

A primer composition was prepared by mixing 8 parts by weight of γ-aminopropyltriethoxysilane, 4 parts by weight of vinyl triethoxysilane, 78 parts by weight of methanol and 9 parts by weight of water, and to it was added hydrochloric acid so that the pH of the mixture might be made 1. This was applied to an aluminum plate at the rate of 40 g/m², and the rest of the experiment was conducted just as in Example 6, obtaining a sample strip.

Result of Test

The sample strips prepared in Examples 1-7 and Controls 1-5 were subjected to the peel strength test and the bond failure test, described before, obtaining the results given in the following table.

| Test No. | Silicone Rubber composition (compound) | Substratum | Primer composition | Amount of primer applied, g./m.² | Peel strength, kg./cm.² | Bond failure, percent |
|---|---|---|---|---|---|---|
| Example: | | | | | | |
| 1 | (A) | Chloroprene rubber | Vinyl trichlorosilane | 170 | 12.1 | 100 |
| 2 | (B) | do | Allyl trichlorosilane | 160 | 8.9 | 8.5 |
| 3 | (C) | do | Vinyl trichlorosilane | 5 | 1.2 | 20 |
| | | | | 10 | 3.5 | 60 |
| | | | | 20 | 7.3 | 100 |
| | | | | 40 | 12.1 | 100 |
| | | | | 60 | 11.9 | 100 |
| | | | | 100 | 12.2 | 100 |
| 4 | (C) | Styrene butadiene rubber | do | 40 | 11.9 | 100 |
| | | Natural rubber | | | 10.8 | 100 |
| 5 | (C) | Iron | do | 40 | 11.5 | 100 |
| | | Aluminim | | | 11.6 | 100 |
| | | Stainless steel | | | 11.5 | 100 |
| | | Epoxy resin | | | 10.8 | 100 |
| 6 | (D) | Iron | do | 40 | 17.3 | 80 |
| | | Aluminum | | | 16.8 | 80 |
| | | Stainless steel | | | 17.0 | 80 |
| | | Porcelain | | | 16.0 | 85 |
| 7 | (D) | Iron | Allyl trichlorosilane | 40 | 8.9 | 85 |
| Control: | | | | | | |
| 1 | (B) | Chloroprene rubber | Methyl trichlorosilane | 160 | 0.8 | 0 |
| 2 | (B) | do | Methyl triethoxy silane | 80 | 1.8 | 10 |
| 3 | (B) | do | Trichloro silane | 160 | 0.2 | 0 |
| 4 | (D) | do | Vinyl triethoxy silane | 80 | 0 | 0 |
| 5 | (D) | Aluminum | γ-Amino propyltriethoxysilane and others | 40 | 1.4 | 10 |

Control 1

A sample strip was prepared just as in Example 2, in which the only difference was that as a primer a commercially available one, containing, as its effective component, methyl trichlorosilane, was applied to a plate at the rate of 160 g/m².

Control 2

A sample strip was prepared just as in Example 2, in which the only difference was that as a primer a commercially available one, containing as its effective component, methyl triethoxysilane was applied to a plate at the rate of 80 g/m².

Control 3

A sample strip was prepared just as in Example 2, in which the only difference was that as a primer a commercially available one, containing, as its effective component, trichlorosilane was employed.

Control 4

A sample strip was prepared just as in Example 2 in which the only difference was that as a primer vinyl triethoxysilane was employed.

Other primers such as vinyl tribromosilane, were also tested as in the above-given examples, each proving to have effective adhesive strength. The primer was found to be applicable to the substrata of glass and its processed products, if the surfaces to be bonded were treated just as in the case of porcelain. Synthetic rubbers include, besides the ones given in the Examples, nitrile rubber, butyl rubber, fluorine contained rubber, and polysulfide rubber, and to every one of them this primer was found to be applicable. As to the effective amount of the primer, it was found to be at least 10 g/m², or more preferably, from 40 to 150 g/m², not only in the case of the primer compositions given in Example 3, but also in the case of other primer.

Example 8

In a paper pipe whose inside diameter was about 232 mm, was put a rubber roll having a diameter of 225 mm, which had been prepared by coating, as described in Example 2, with chloroprene rubber (ASTM hardness: 75, 15 mm thick) and vinyltrichlorosilane a steel roll, about 195 mm in diameter, and the paper pipe and the rubber-coated steel roll were concentrically fixed. In the space between the roll and the paper pipe was injected a mixture of silicone Compound (B) and Catalyst (a) and after it was cured, the paper pipe was removed. The RTV-coated pipe was finished by polishing, and a roll with a 230 mm diameter and covered with RTV, 2.5 mm thick, was obtained.

The hardness of RTV rubber on the surface of the roll was 70, and when the roll was subjected to the rolling and pressing test mentioned above, the result proved that even after 180 workdays, no change was observed to take place in it.

Example 9

A rubber-coated steel roll having a diameter of 190 mm and prepared by coating as described in Example 1 with chloroprene (ASTM hardness 55: 10 mm thick) and vinyltrichlorosilane a steel roll, 170 mm in diameter, was revolved at the rate of about 50 rpm, and while it was revolved, a mixture of Compound (A) and Catalyst (a) was uniformly flowed over its surface. After about 1 hour's operation, the revolution of the roll was gradually brought to a standstill, so that curing of the RTV might be conducted successively.

Subsequently, the RTV-coated roll was subjected to a slight abrasion, and a roll with a diameter of 200 mm, covered with RTV, 5 mm in thickness, was obtained.

As given above, the hardness of RTV on the surface of the roll was 55, and when the roll was subjected to the rolling and pressing test mentioned before, the result proved that even after 180 workdays, no change was observed to take place in it.

The same RTV-coated roll was used for six months consequtively for heat-pressing and bonding wet sheets. By the complex elasticity given by the undercoating chloroprene layer and the over-coating RTV layer, a uniform and desired nip pressure was maintained throughout the operation, and the surface of the roll was hardly stained. This heating roll was operated at surface speed of 90 m/min and the temperature on the surface of the roll was kept at about 100° C.

Example 10

Over a revolving roll of steel tube having a diameter of 80 mm and prepared by coating with vinyltrichlorosilane, was flowed RTV compounded as in Example 5, so that the roll might be coated with the RTV, 3 mm in thickness, just as in Example 9, and then the RTV-coated roll was subjected to a slight polishing to give the last finish. This roll was employed, as a conductive roll, in preparing cellophane adhesive tape, in which the roll came in contact with the adhesive side of the tape. The releasability of the tape was excellent, and no change was observed to take place after 6 months' operation in the roll.

The releasability of the roll, when tested by the following method proved to be 5–10 g/cm, far superior to that of a plate of polyethylene tetrafluoride (120–170 g/cm) or of the polished surface prepared by coating with compound (D), employed as a coating material (20–50 g/cm).

RELEASABILITY

Cellophane adhesive tape was pressed for 20 hours under the pressure of 20 g/cm² in order to make it adhere to the test piece, and then it was peeled in the direction of 180° at the velocity of 30 cm/min. The power needed for carrying it out was employed to denote the releasability of the test piece.

Example 11

A textile loop belt coated with chloroprene and vinyl-trichlorosilane, which was 5.5 mm thick, and about 850 mm in the whole length, was fastened to a roll, 270 mm in diameter, and over the outer surface of the belt was flowed RTV, compounded as in Example 9, while the belt was revolved just as in Example 9, so that the belt might be coated with a 2 mm thick RTV. The belt thus treated was then subjected to polishing. No change was observed to take place in the belt after it was used for 6 months at a high tension and bending in which a high degree of releasability and heat resistance were required.

Example 12

The RTV coated roll prepared in Example 8 was employed as a press roll in bonding polyethylene film onto cellophane. It was proved, as the result, that the roll could fully satisfy the requirements such as resistance to the nip pressure of 15–20 kg/cm, heat stability against the molten polyethylene film which was at 240°–270° C., releasability which made it possible for the molten polyethylene never to stick to the surface of the roll, smoothness of the surface which made the surface of the solidified polyethylene film smooth, and durability, sufficient to make a consecutive operation of at least a month. No change was observed to take place in it after 3 months' consecutive operation.

As compared with a roll coated with a single silicone rubber of heat-curing type, which had been used for the above-given purposes, this roll showed a remarkable superiority, especially in releasability and in the smooth finish it gave to the surface of the polyethylene film. Moreover, the cost of coating was about two-thirds that in the conventional case.

Another roll coated just as given above with RTV prepared as in Control 1, was subjected to the same uses. When it was put to a consecutive use, the layer of RTV and that of chloroprene rubber fell apart in about 10 hours.

What is claimed is:

1. A layer composition which is prepared by bonding a room temperature-curing type silicone rubber and a synthetic rubber layer with a primer consisting essentially of organotrihalogenosilane represented by the general formula:

$$RSiX_3$$

wherein R is selected from the group consisting of vinyl radical and allyl radical, and X is a halogen atom.

2. The layer composition claimed in claim 1 in which the organotrihalogenosilane is selected from the group consisting of vinyltrichlorosilane, vinyltribromosilane, allyltrichlorosilane and allyltribromosilane.

3. The layer composition claimed in claim 1 in which the synthetic rubber layer is made of chloroprene or styrenebutadiene.

4. A roll of layers which is prepared by bonding room-temperature-curing type silicone rubber and a substratum roll made of synthetic rubber, alone or a metal axis coated with synthetic rubber, with a primer consisting essentially of organotrihalogenosilane represented by the general formula:

$$RSiX_3$$

wherein R is selected from the group consisting of vinyl radical and allyl radical and X is a halogen atom.

5. A method for preparing a layer composition which is characterized by applying to the surface of a substratum layer, made of synthetic rubber, a primer consisting essentially of organotrihalogenosilane represented by the general formula:

$$RSiX_3$$

wherein R is selected from the group consisting of vinyl radical and allyl radical, and X is a halogen atom at the rate of at least 10 g/m², and subsequently coating the primer-treated surface with room temperature-curing type silicon rubber.

6. The method for preparing a layer composition claimed in claim 5 in which the organotrihalogenosilane is selected from the group consisting of vinyltrichlorosilane, vinyltribromosilane, allyltrichlorosilane and allyltribromosilane.

7. A method for preparing a layer composition which is characterized by applying to the surface of a substratum roll made of synthetic rubber alone or a metal axis coated with synthetic rubber, a primer consisting essentially of organotrihalogenosilane represented by the general formula $RSiX_3$ wherein R is selected from the group consisting of vinyl radical and allyl radical, and X is a halogen atom at the rate of at least 10 g/m², and subsequently coating the primer-treated surface with room temperature-curing type silicone rubber.

* * * * *